Patented Aug. 4, 1936

2,049,765

UNITED STATES PATENT OFFICE 2,049,765

LUMINESCENT GLASS AND METHOD OF MAKING SAME

Hellmuth Fischer, Ilmenau, Germany

No Drawing. Application June 24, 1933, Serial No. 677,457. In Germany May 9, 1932

14 Claims. (Cl. 106—36.1)

My invention relates to improvements in luminescent inorganic glass and the process of manufacturing the same, that is glass which when acted upon by various visible or non-visible rays is adapted to emit light rays. Such glass may be used for various purposes, for example in electrical discharge tubes. Heretofore such tubes were ordinarily made from uranium glass which is adapted, by the action of the rays produced within the tube, to emit green light. Further, luminescent glass has been manufactured by adding compounds of neodymium, praseodymium, vanadium, and cerium to the glass. However, the luminescence of such glass is less intense than that of the uranium glass. Further, the number of the sorts of luminescent glass and therefore the variety of the colours is limited. For gaining greater variety it has been suggested to coat the said tubes with luminescent masses or light-emitting colours which can be manufactured in a great variety of colour emission. However, such coatings are acted upon by the electrical strain and chemical influences, and particularly in case of metal vapour tubes by the said metal vapour, whereby the composition and the luminosity of the mass is rapidly spoilt, and the tubes can be used only for a comparatively short time. Further, in course of time, and also by the vibrations during shipping, parts of the luminescent mass break off, so that the luminescence is spoilt.

One of the objects of the improvements is to provide a process by means of which sorts of glass of a great variety of luminescence can be made, which sorts of glass maintain their luminescence for any length of time, and with this object in view the invention consists in manufacturing a glass in which the luminescent mass is contained in the body of the glass, the said luminescent mass having any of the compositions of luminescent masses which are now in the trade, and even compositions of luminescent masses which in pure form have a low stability so that they can not be practically used. Further, within the glass luminescent masses may be produced which can not be manufactured in pure form and independently of the glass.

In the following description of the invention the term luminescent mass is understood to indicate a substance which consists of two main components, viz., a ground compound and a metal compound or "sensitizing agent" adapted to activate the said ground material, the said luminescent masses being adapted to emit light of different colours when they are acted upon by rays of various character. The concentration of the sensitizing agent in the luminescent mass must be within definite limits in order that intense luminosity be obtained, and the said limits may be varied according to the result aimed at, that is according as a very intense momentary emission of light is desired or an emission that lasts after the action of the energizing rays has ceased. In this context, and also in the following description of various sorts of glass, the term "rays" includes pure wave rays such as Röntgen rays, gamma rays, ultraviolet and visible light rays, and also corpuscular rays such as alpha and beta rays, cathode rays, etc. The luminescence may consist in an emission of rays which takes place only while the energizing rays act on the glass, and it may also consist in an emission of rays which continues for a shorter or longer period of time after the action of the rays has ceased.

It has heretofore been tried to manufacture luminescent glass by adding the luminescent mass as such to the components from which the glass is made or to the glass in the course of the melting process. But this process has been unsatisfactory, because the glass had at the most a very weak luminescence.

I have discovered that a glass of high luminescence is obtained by separately adding the components of the luminescent mass, that is the ground compound and the sensitizing agent to the glass. The high luminescence of the glass thus obtained shows that a luminescent mass is contained in the glass.

Further I have found that the best results are obtained if the percentage of the sensitizing agent in the body of glass is substantially within the same limits as the percentage of the said sensitizer within the pure luminescent mass (that is the mass which exists separately of the glass), and that, if the percentage is within the said limits, the glass has an energetic luminescence, which may be either momentary and while the glass is being energized by rays, or which may continue after the action of the rays has ceased. Thus, when the percentage of the sensitizing agent to be added to the body of glass is calculated, the whole mass of the glass is assumed to be the luminescent mass. The essential part of the sensitizing agent is the metal. Ordinarily different compounds of the same metal give the same colour of luminescence. The ground material or compound may be added to or formed in the body of glass in various proportions, and its amount exclusively depends on the intended use and the desired properties of the luminescence of the glass. It may be far more than 1%, but it may also be less than 1%.

For example, in a known luminescent mass composed of zinc sulfide as a ground material or compound and manganese as the sensitizing agent a good luminescence is obtained if one part of manganese (Mn) is added to 100 parts of zinc sulfide. In order to obtain good luminescence in a body of glass from the same components, I add for example 2% of zinc sulfide to the glass, but the amount of manganese is not 1/100 of the mass of zinc sulfide, but 1/100 of the total amount of glass and zinc sulfide added thereto. Of course, in both cases the manganese is added in the form of a suitable compound. Thus the amount of sensitizing agent added to the glass is considerably increased as compared to the amount of ground material added to the glass. In the example referred to above the amount of manganese added to the glass is 50 times that contained in the luminescent mass produced independently of and applied as a coating to the glass.

The ratio of sensitizing agent and ground compound in pure luminescent masses varies within very broad limits, even in the same compounds, and the said ratio or ratios are known in the art, so that a few examples given hereinafter will be sufficient for a clear understanding of the invention.

Preferably the sensitizing agent is added to the batch, that is the components from which the glass is made. But it may also be added in any stage of the melting process, or even to the finished glass which may also be in a pulverized or liquid state. A prerequisite for the combination of the ground material and the sensitizing agent into a luminescent mass is that the ground material be present at the end of the melting process in its original or unchanged form within the body of glass, and that it form certain particles, when it takes up the sensitizing metal compound, which generally have the size of colloids, and which have a structure causing luminescence under the influence of rays. As to the character of this structure the opinions of science are so far divided. These particles or colloids may be so small in size that they do not interfere with the transparency of the glass. But in case of some sulfides and selenides the particles are separated in such size that the glass is to some extent opacified. Even where no visible separation of the ground material takes place, there is an interesting interaction or combination of the particles of the ground material and those of the sensitizing agent that causes luminescence of the glass.

In order to insure that at the end of the melting process and when the glass is taken from the melting receptacle the ground material be present in the body of glass as such and without having undergone a chemical change, I add the said ground material to the body of glass together with the last portion of the batch. When the ground material is very sensitive and is readily combined with other components of the glass, I defer adding the last portion of the batch, having the ground material admixed thereto, until the chemical reaction of the glass-melting process is finished. In this case the last portion of the batch must consist of substances of low melting-point which are rapidly dissolved in the body of glass, such as borax, calcium carbonate, alkali silicates, alkali aluminates, or mixtures of the said substances.

As sensitizing agents I prefer to use compounds of the heavy metals, that is manganese, copper, zinc, tin, bismuth, lead, thallium, silver, antimonium, cadmium, nickel, tungsten, molybdenum compounds. Further, I may use compounds of the rare earths, such for example as cerium, lanthanum, yttrium, praseodymium, neodymium, samarium, europium, gadolinium, terbium, dysprosium, erbium, etc. Preferred ground materials for luminescent masses are particularly the oxides, sulfides, and selenides of zinc, calcium, strontium, barium, magnesium, beryllium, aluminium, zirconium, thorium, lanthanum, and rubidium. But good results have also been obtained with ground materials consisting of the sulfates, carbonates, borates, silicates, molybdates, tungstates, phosphates, and fluorides of the said metals.

To the components of the glass or the body of glass simultaneously a single sensitizing agent and a single ground material are added. In this case a simple luminescent mass is obtained. But I may simultaneously add two or more compounds of different sensitizing metals and two or more ground materials, in which case a mixed luminescent mass is obtained.

In the following I give a few examples of the composition of the luminescent glasses:

Example 1

| | |
|---|---|
| $SiO_2$ | 66,5 |
| $Al_2O_3$ | 3,0 |
| $B_2O_3$ | 3,0 |
| $CaO$ | 3,0 |
| $ZnO$ | 5,0 |
| $K_2O$ | 5,0 |
| $Na_2O$ | 11,5 |
| $MnS$ | 0,7 |
| $ZnS$ | 2,3 |

The last-named compounds MnS and ZnS provide the luminescent mass, MnS being the sensitizing agent and ZnS the ground material. MnS can be added at once to the batch and ZnS is given to the glass together with the last part of the batch.

The glass contains a zinc sulfide-manganese luminescent mass. In the dark ultraviolet of a quartz lamp (the rays of which have passed a dark filter) it has an energetic orange-yellow luminescence, and the luminescence ceases or slightly continues after the lamp has been switched out. When the glass is acted upon by cathode rays, for example when it is used as a receptacle for a cathode ray oscillograph, the bottom of which acts as a luminous screen, it likewise has a strong orange-yellow luminescence. The glass may also be used as a luminous screen in a Braun's tube, which otherwise is made from another glass having no luminescence. The glass shows the same colour of luminescence when it is used as the wall of a tube which is filled with a mixture of rare gases and mercury vapour. The mixture of rare gasses and mercury vapour emits mainly blue rays, and simultaneously the wall of the tube emits mainly orange-yellow rays. By additive colour mixture a white light is produced. When the tube is switched out the glass wall continues to emit yellow rays.

Example 2

| | |
|---|---|
| $SiO_2$ | 74,8 |
| $B_2O_3$ | 4,0 |
| $Na_2O$ | 12,3 |
| $K_2O$ | 7,7 |
| $PbO$ | 0,4 |
| $MgO$ | 0,8 |

The last-named compounds PbO and MgO provide the luminescent mass, PbO being the sensitizing agent and MgO the ground material or compound. PbO is given to the batch at once and MgO is incorporated into the liquid mass of glass when the chemical reactions of the melting process are substantially finished.

The glass contains a luminescent mass consisting of magnesium oxide and lead. In the dark ultraviolet it has a pink luminescence.

*Example 3*

| | |
|---|---|
| $SiO_2$ | 75,0 |
| $B_2O_3$ | 4,1 |
| $Na_2O$ | 12,3 |
| $K_2O$ | 7,8 |
| $(La,Pr,Nd)_2O_3$ | 0,2 |
| $Al_2Se_3$ | 0,6 |

The last-named compounds $(La,Pr,Nd)_2O_3$ and $Al_2Se_3$ provide the luminescent mass, $(La,Pr,Nd)_2O_3$ being the sensitizing agents, and $Al_2Se_3$ the ground material. The two compounds are added to the glass in the same manner as in Example 2.

The glass contains a mixed luminescent mass based on aluminium selenide, lanthanium and didymium. In the dark ultraviolet it has an orange luminescence, and when it is used as the wall of a neon sign tube it mainly has a red luminescence spectrum. The light effect of the said tube filled with the aforesaid gas mixture emitting bluish rays is white with a little purple.

The glass contains a mixed luminescent mass the ground material of which consists of barium sulfate and beryllium sulfate, and the sensitizing agent of which is nickel. In the dark ultraviolet the glass has a red luminescence.

*Example 4*

| | |
|---|---|
| $SiO_2$ | 68,45 |
| $B_2O_3$ | 3,50 |
| $Al_2O_3$ | 3,50 |
| $Na_2O$ | 12,50 |
| $K_2O$ | 5,00 |
| CaO | 6,00 |
| $Sa_2O_3$ | 0,05 |
| $La_2O_3$ and $La_2(CO_3)_3$ | 1,00 |

The last-named compounds $Sa_2O_3$ and $La_2O_3$, $La_2(CO_3)_3$ provide the luminescent mass, $Sa_2O_3$ being the sensitizing agent and $La_2O_3$, $La_2(CO_3)_3$ being the ground materials. $Sa_2O_3$ is given to the batch and $La_2(CO_3)_3$ is mixed with the glass a short time before the melting process is finished. It is decomposed partly into $La_2O_3$ and $CO_2$.

The glass contains a mixed luminescent mass in which lanthanium oxide and lanthanium carbonate are the ground materials and samarium the sensitizing agent. In the dark ultraviolet the glass has an orange-yellow luminescence. The spectrum of the luminescence is arranged in bands.

By my improved process luminescent glass may be manufactured in which the luminescence continues for an exceedingly short period of time after the action of the rays has been interrupted. This is important in many cases, for example in the complete or partial manufacture of Braun's cathode ray tubes made from such glass. The light effect of neon sign tubes made from my improved glass is improved, because the gas or metal-vapour spectrum which consists of lines only is completed by the continuous spectrum of the luminescence of the glass.

The glass used in my process may be translucent or opacified, coloured or colourless, and I may use any of the opacifying or colouring media which are known in the art. By colouring and opacifying the glass the colour of the luminescence and also the colour of a source of light located at the rear of the glass may be varied, either by the absorbing action of the colouring oxides, or by diffraction of the light rays by the opacifying particles.

I have found that it is not necessary to add the ground material of the luminescent mass in its final form to the components of the glass or to the partly or completely molten body of glass. In a modification of the process the ground material is formed in the glass from other substances. The ground material may be formed as follows:

1. The material is combined from the elements or other compounds forming the ground material. In this case the said elements must be added to the batch or to the body of glass. In this way the oxides, sulfides and selenides of the said metals may be formed. For example in the glass described in Example 3 the aluminium selenide may be formed by adding to the glass at the same point in the progress of the operation corresponding amounts of metallic aluminium and black selenium, which are combined while producing a flame. For forming oxides, in addition to the metal, compounds such as saltpetre are added which at elevated temperature develop oxygen. Zinc silicate may be produced in the glass to provide the ground material of luminescent masses by simultaneously adding zinc oxide and most finely divided silicic acid in thorough mixture and at a suitable moment of the glass melting process.

2. The ground material may be formed by decomposition of other compounds. For example the oxides may be produced in glass by adding thereto carbonates which are decomposed more or less into oxide and carbonic acid, according as they are added in an earlier or later stage of the melting process. In the glass referred to in Example 4 the mixture of lanthanium oxide and lanthanium carbonate has been thus produced.

3. The ground material may be produced by other chemical transformations. Sulfides can be produced by reduction of sulfates or sulfites, and selenides by reduction of selenates or selenites by means of metals. In this process the metals are transformed into the oxides which likewise may be used as ground materials for the luminescent masses. Thus, for example, from the following compounds of glass:

| | |
|---|---|
| Sand | 67,50 |
| Calcium carbonate | 7,40 |
| Zinc oxide | 4,80 |
| Boric acid | 5,30 |
| Soda | 17,70 |
| Calcined potash | 8,10 |
| Manganous oxide | 0,15 |
| Anhydrous magnesium sulfate | 2,46 |
| Powdered aluminium | 1,80 | a glass of the following composition is obtained:

| | |
|---|---|
| $SiO_2$ | 67,50 |
| $B_2O_3$ | 3,00 |
| CaO | 4,15 |
| ZnO | 4,75 |
| $Na_2O$ | 10,30 |
| $K_2O$ | 5,50 |
| MnO | 0,15 |
| $Al_2O_3$ | 3,50 |
| MgS | 1,15 |

The said glass contains a mixed luminescent mass in which magnesium sulfide MgS and aluminium oxide Al₂O₃ are the ground materials and manganese MnO the sensitizing agent.

The glass has a light green-yellow tint, in the dark ultraviolet it has a strong egg-yellow luminescence, and when it is used as the vessel of a cathode-ray tube or a neon-sign tube the luminescence continues for a long time in an intense yellow to green-yellow tint. A similar reaction applies to the formation of selenides of the appropriate metals apart from oxides. It will be understood that further transformations are possible for producing the desired ground materials. For example sulfides may be obtained as ground materials by transformation with alkali sulfide which must be present in the batch or in the body of glass.

4. The ground material of a luminescent mass in the glass may be produced by adding substances to the molten body of glass which cause the formation of smallest devitrification nuclei. Thus from a silicic acid glass which is rich in lime smallest particles of calcium silicate are split off by the addition of finely divided silicic acid, which silicate may be used as a ground material for luminescent masses. From a silicic acid glass which is rich in alumina (Al₂O₃) finest particles of aluminium silicate may be split off which may form the ground material of luminescent masses.

The above-named methods of forming ground materials may be combined with each other or a plurality thereof may be simultaneously used in order to cause the formation of one or more ground materials in the same glass.

The luminescent glass made by my improved process may be used for various purposes. An important field of its use is the manufacture of electrical discharge tubes.

I claim:

1. The method herein described of producing luminescent glass which consists in bringing together within a molten body of glass a sensitizing agent consisting of a compound of a metal of a group that consists of manganese, cadmium, cerium, lanthanum, samarium, and yttrium, and a ground material of a group that consists of the oxide, the sulfide, and the selenide of calcium, magnesium, lanthanum, aluminum, strontium, barium, beryllium, zinc, and zirconium, the percentage in which the sensitizing agent is present in the glass being substantially the same as its percentage in a luminescent mass consisting of the ground material and the sensitizing agent and nothing more.

2. The method herein described of producing luminescent glass which consists in compounding with the glass batch a compound of samarium, melting, and adding to the molten glass, after the chemical reactions of the melting process have progressed, lanthanum oxide.

3. The method herein described of producing luminescent glass which consists in compounding with the glass batch a compound of manganese, melting, and adding to the molten glass, after the chemical reactions of the melting process have progressed, zinc sulphide.

4. The method herein described of producing luminescent glass which consists in compounding with the glass batch a compound of manganese, melting, and adding to the molten glass, after the chemical reactions of the melting process have progressed, zirconium selenide.

5. The method herein described of producing luminescent glass which consists in smelting with the components of a glass batch manganese sulphide in an amount of substantially 0.7% of the whole, and, after the smelting operation has progressed, adding zinc sulphide in the amount of substantially 2.3%.

6. The method herein described of producing luminescent glass which consists in smelting a batch compounded of silicon oxide, substantially 66.5%; aluminum oxide, substantially 3%; boron oxide, substantially 3%; calcium oxide, substantially 3%; zinc oxide, substantially 5%; potassium oxide, substantially 5%; sodium oxide, substantially 11.5%; manganese sulphide, substantially 0.7%; and, after the smelting operation has progressed, adding zinc sulphide in the amount of substantially 2.3%.

7. The method herein described of producing luminescent glass which consists in smelting with the components of a glass batch samarium oxide in an amount substantially 0.05% of the whole, and, after the smelting operation has progressed, adding La₂O₃ and La₂(CO₂)₃ in the amount of substantially 1%.

8. The method herein described of producing luminescent glass which consists in smelting a batch compounded of silicon oxide, substantially 68.45%; boron oxide, substantially 3.5%; aluminum oxide, substantially 3.5%; sodium oxide, substantially 12.5%; potassium oxide, substantially 5%; calcium oxide, substantially 6%; samarium oxide, substantially 0.05%; and, after the smelting operation has progressed, adding La₂O₃ and La₂(CO₂)₃, in the amount of substantially 1%.

9. The herein described luminescent glass, which comprises the glass-forming components together with lanthanum oxide and a compound of samarium.

10. The herein described luminescent glass, which comprises the glass-forming components together with La₂O₃ and La₂(CO₂)₃, substantially 1% of the whole, and Sa₂O₃, substantially 0.05%.

11. The herein described luminescent glass, which comprises the glass-forming components together with a ground material and a sensitizing agent combined within the substance of the glass into luminescent bodies, the ground material being selected from a group that consists of the oxides, the sulphides, and the selenides of calcium, magnesium, lanthanum, aluminum, strontium, barium, beryllium, zinc, and zirconium, and the sensitizing agent being selected from a group that consists of compounds of the metals manganese, cadmium, cerium, lanthanum, samarium, and yttrium.

12. The herein described luminescent glass, which comprises the glass-forming components together with zinc sulphide and a compound of manganese.

13. The herein described luminescent glass, which comprises the glass-forming components together with zinc sulphide in the amount of substantially 2.3% and manganese sulphide, substantially 0.7%.

14. The herein described luminescent glass, which comprises the glass-forming components together with zirconium selenide and a compound of manganese.

HELLMUTH FISCHER.